UNITED STATES PATENT OFFICE.

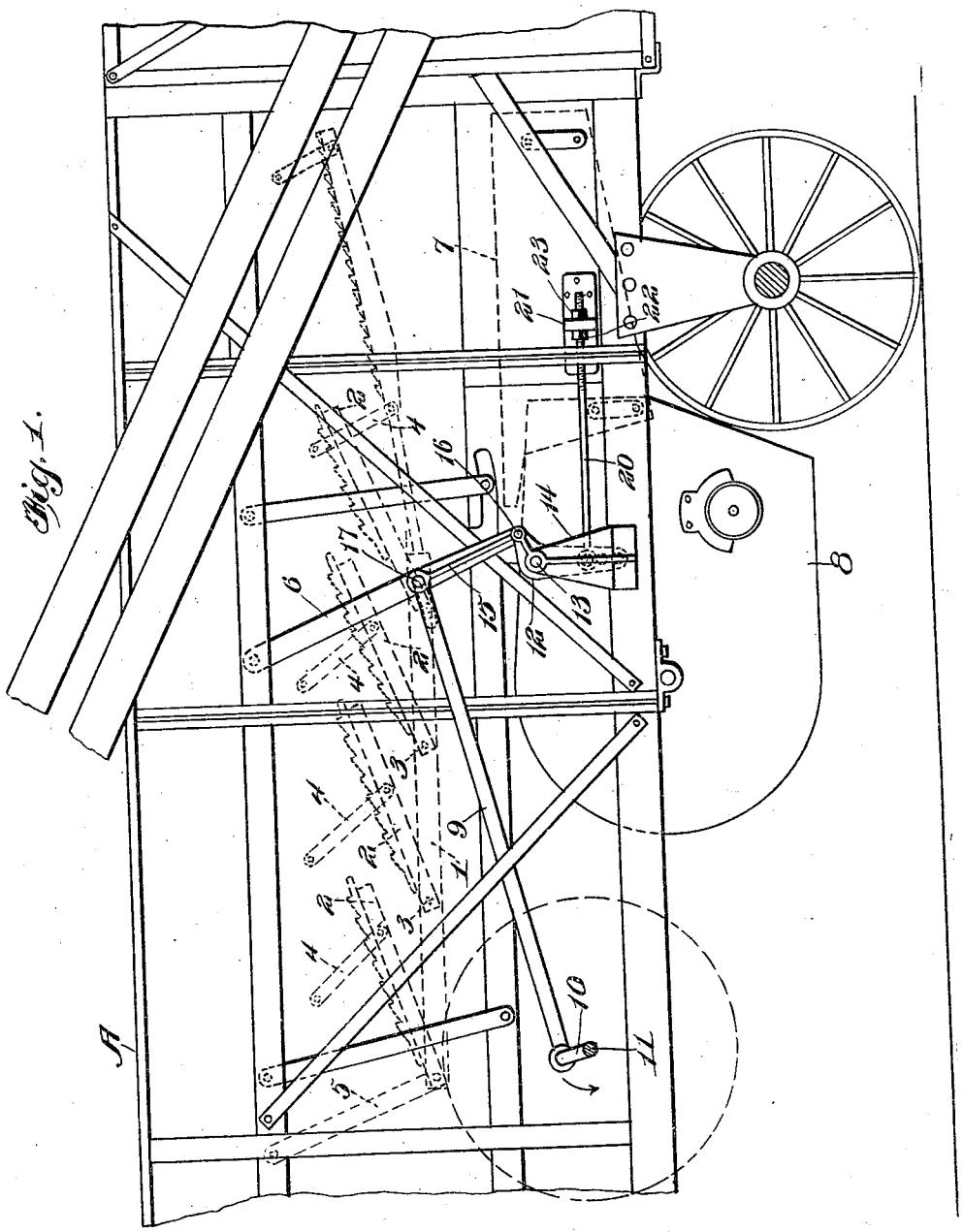

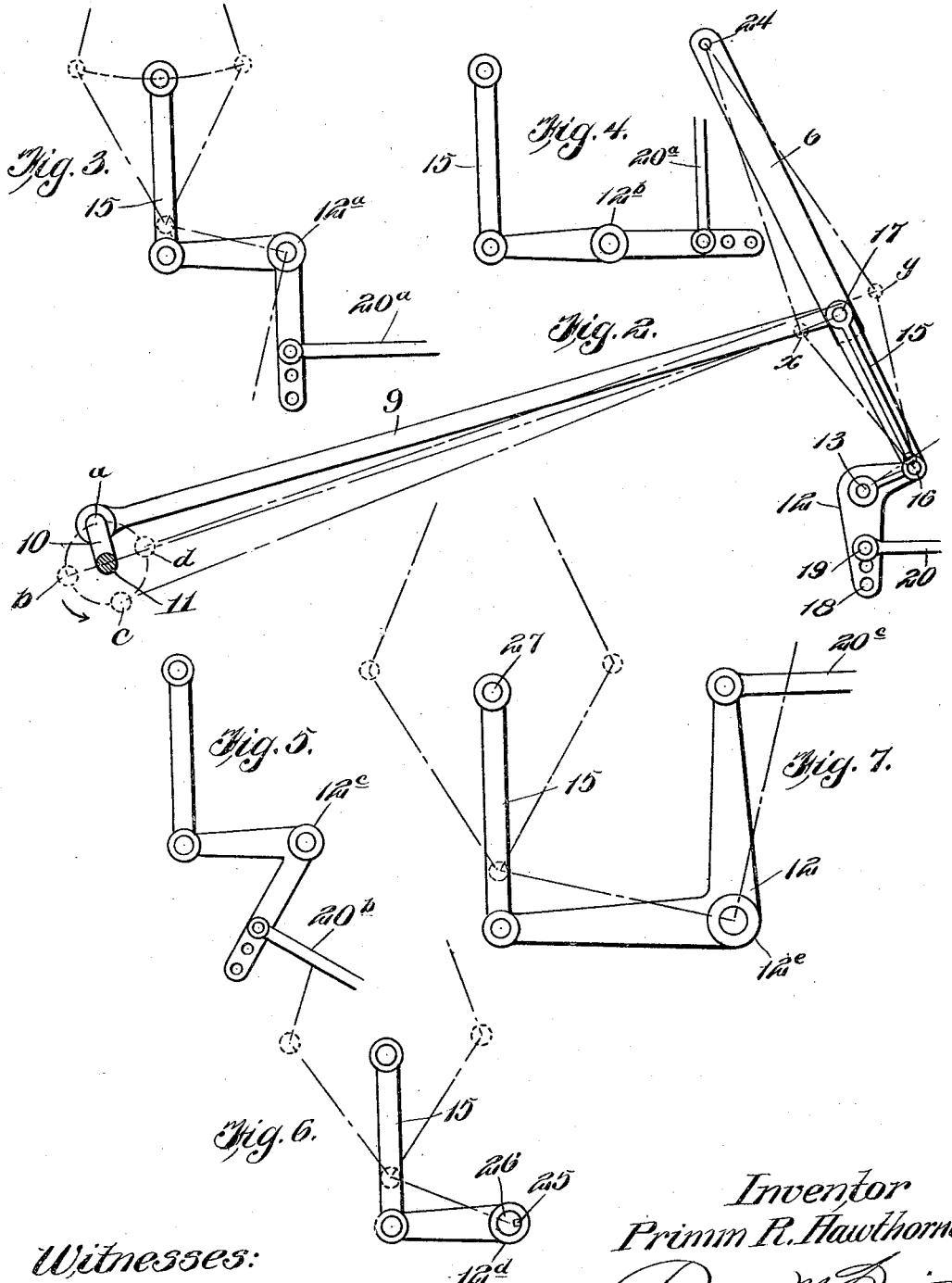

PRIMM R. HAWTHORNE, OF BATTLE CREEK, MICHIGAN.

SHOE-OPERATING MECHANISM FOR GRAIN-SEPARATORS.

1,138,591.  Specification of Letters Patent.  Patented May 4, 1915.

Application filed November 25, 1914. Serial No. 873,898.

*To all whom it may concern:*

Be it known that I, PRIMM R. HAWTHORNE, a citizen of the United States, residing at Battle Creek, in the county of Calhoun and State of Michigan, have invented new and useful Improvements in Shoe-Operating Mechanism for Grain-Separators, of which the following is a specification.

This invention relates to shoe operating means or mechanism for grain separators, the object in view being to produce positively acting means associated with one of the main vibratory elements of a grain separator or threshing machine whereby the shoe is operated at a higher speed than the element by which it is driven and also with an absolutely positive and uniform action.

On practically all makes of grain separators of the present day, the drive for the shakers or straw racks is entirely separate from the drive for the shoe, one reason for this being that the shoe is usually run at a higher speed than the straw racks. This is usually accomplished either by a crank or a pair of eccentrics in connection with a pulley and driving belt, the latter being usually narrow and therefore failing to insure an absolutely positive and uniform drive.

The device or means of this invention is so arranged, in the preferred embodiment thereof, as to operate the shoe from the main separator crank shaft by connections between the shaker and the shoe which gives a certain relative speed to the shoe as compared with the shakers or straw racks or the grain pan which is not always true of a shoe driven by a belt. Incidentally a cheaper and far more reliable construction and arrangement of parts is obtained, doing away also with the necessity of taking up slack in the driving belt and renewing the belt from time to time.

With the above and other objects in view, the invention consists in the novel construction, combination and arrangement of parts, as herein described, illustrated and claimed.

In the accompanying drawings:—Figure 1 is a side elevation of a sufficient part of a grain separator or threshing machine to illustrate the application of the present invention thereto, the shoe, the shaker carrier and the shakers and their links being shown in dotted lines. Fig. 2 is an enlarged detail side elevation illustrating the connections between the shaker carrier and shoe, showing the main crank shaft in cross section. Figs. 3 to 7 inclusive are diagrammatic views illustrative of different applications of the principle of the invention.

Referring to the drawings A designates generally a portion of one of the side frames of a grain separator, 1 the shaker carrier, 2 the shakers which are ordinarily pivotally connected to the carrier 1 at the points 3 and supported at other points by the links or hangers 4, the shaker carrier being supported by links 5 and 6 all as clearly shown in Fig. 1.

7 designates the shoe provided with the usual screens and sieves through which the threshed grain passes, the oscillatory movements of the shoe 7 in conjunction with the blast from the fan, the casing of which is designated at 8, effect the final cleaning of the grain before it is delivered from the separator.

9 designates the pitman which drives the shaker carrier 1 and the shakers 2, said pitman being connected to the crank 10 of the main crank shaft 11 so that in each complete revolution of said crank shaft, two strokes are imparted to the members 1 and 2, one in a forward direction and the other in a rearward direction.

In carrying out this invention, I employ a rocker 12 which, in the preferred embodiment of the invention, is in the form of a bell crank lever. This rocker or lever is mounted to rock on a pivot or pin 13 which is carried by a supporting bracket 14 fastened at a convenient point to the machine frame. A link 15 is pivotally connected at 16 to one arm of the rocker or bell crank lever and has its other end connected to the shaft 17 by which the adjacent extremity of the pitman 9 is connected to the shaker carrier 1.

The other arm of the rocker or bell crank lever is provided with a series of holes 18 any one of which is adapted to receive the pivot or pin 19 which connects one end of an operating rod 20 thereto, said rod 20 being attached at its opposite end to the shoe 7 in the manner shown, for example, in Fig. 1 wherein the shoe is provided with a projecting lug 21 through which the rod 20 passes, said rod being threaded as shown and provided with nuts 22 and 23 at opposite sides of the lug 21 to provide for an accurate adjustment between the shoe 7 and the rocker 12. The holes 18 provide for varying the length of stroke of the shoe in order to better adapt the machine to operate under different grain conditions.

The action of the shoe shaking device is as follows: Starting with the crank 10 in the position shown in Fig. 2 and traveling in the direction of the arrow, the shaft 17 at the opposite end of the pitman stands in a central position with the points 16 and 17 in practically a straight line with the pivot point 24 of the swinging link 6. The rocker 12 then occupies the position shown in Figs. 1 and 2. As the crank 10 moves from the position $a$ to the position $b$, the shaft 17 moves to the position $x$ as do also the center lines of the rocker 12. As the crank 10 travels from the position $b$ to the position $c$, the shaft 17 moves from the position $x$ back to the point first referred to. This makes one outward and one return stroke of the shoe in one half of a revolution of the crank shaft 11. The shaft 17 and all other parts between said shaft and the shoe and including the shoe itself, stand at exactly the same position as the starting point. As the crank 10 travels from the position $c$ to the position $d$, the shaft 17 moves to the position $y$ and the center lines of the rocker 12 move correspondingly making the rocker and shoe stand at the extreme end of the outward stroke, the same as when the crank 10 was at the position $b$. As the crank travels from the position $d$ to the point $a$, the shaft 17 moves back to its medial or original position and the shoe travels on its backward stroke to its original position. The shoe therefore makes two outward and two return strokes during one revolution of the separator crank shaft 11. This secures higher speed, with a positive drive, from a principal part of the separator without the use of an additional crank shaft, eccentrics, belts, pulleys or gears to accomplish the desired positive drive and higher speed.

Among the advantages to be noted are, first, the usual driving belt and pulleys which have heretofore been used to operate the shoe are dispensed with. The belts usually employed are necessarily narrow and subject to stretch under different weather conditions, and are consequently not such as to insure positive drive.

Secondly, the device dispenses with the usual crank shaft or eccentrics, bearings and pulleys, and the necessary bearing metal and labor required to attach such parts to the machine, and the usual amount of work and trouble required to keep such parts properly adjusted and in working condition.

Thirdly, no part of the operating device of this invention has a rotating action. Each of the parts has an oscillatory or vibratory movement and they may be made sufficiently large to withstand more than ordinary use and are consequently subject to very little wear.

Fourth, four strokes of the shoe are obtained for each revolution of the separator crank shaft and each complete back and forth stroke of the shaker carrier, straw racks and grain pan.

In actual practice it has been demonstrated that the action of the shoe when driven by the means hereinabove described produces far more satisfactory results from the shoe itself than when driven from a crank, even though the crank itself gives the shoe the same travel and same number of strokes per minute. This is accounted for by the fact that the speed of the shoe is uniform throughout the entire length of its stroke. That is to say, the acceleration of speed at the beginning of the stroke of the shoe is more rapid than when driven by a crank. The speed of the shoe at the center of its travel is not as great as when driven by a crank. The speed at three-quarter travel is faster than when crank driven and continues faster until near the end of the stroke, the retarding action just before the extreme end of the stroke being much quicker. This makes a more uniform travel of the shoe throughout its entire stroke. On account of this, the grain falls through the sieves contained within the shoe more uniformly. With a crank driven shoe, grain may be seen dropping through the sieve at intervals corresponding with the strokes, while with the device of this invention, the grain falls continuously and uniformly and it is impossible to distinguish the strokes by watching the grain fall through the sieves.

Various modifications of this device and the arrangement of the elements thereof may be resorted to as shown in Figs. 3 to 7 inclusive. Under the arrangements shown in said figures, the driving motion may be either in an arc of a circle or in a straight line. The link 6 is so placed relatively to the center of some other point of travel of the arc or straight line that it will reach an extreme end of its stroke when the driving member is at either end of its own stroke. Then at some other point in the stroke of the driving member, the link will have assumed its opposite extreme position. In all of these figures, the driven member makes twice as many strokes as the driving member.

Fig. 3 shows the rocker 12$^a$ with the horizontal arm thereof extending in the reverse direction as compared with the showing in Figs. 1 and 2. Fig. 4 shows the two arms of the rocker practically in line with each other, the rocker being indicated at 12$^b$ and the rod 20$^a$ extending in a substantially vertical direction. In Fig. 5, the rocker 12$^c$ has the two arms thereof arranged at an acute angle so that the rod 20$^b$ may be inclined. In Fig. 6 the rocker 12$^d$ is shown as keyed at 25 to a rock shaft 26, in which case the resulting motion is oscillatory and a corresponding movement is therefore imparted to any member or members connected with said rock shaft. The arrangement shown in Fig. 6 may be worked to advantage in operating sieves or shakers at twice the speed of the driving member. Fig. 7 discloses a plan whereby this device may be used to secure double speed for a link or plunger operating approximately on the same straight line or in the same general direction of the arc of travel of the driving member, the rocker being shown at 12ᵉ and the rod 20ᶜ moving in the same general direction as the arc described by the pivot 27 of the link which actuates said rocker.

Actual field trials made to determine whether the best results could be obtained by operating the shoe of a grain separator laterally with respect to the length of the machine, or in the same general direction as the straw shakers and grain pan, have proven conclusively that a beneficial result is due to operating the shoe in the same general direction as the grain pan and straw shakers. A shoe operated in the same general direction as the straw shakers and grain pan overcomes the objectionable feature necessitating that the separator be set so nearly on a perfect level as to properly distribute the grain on the sieves carried within the shoe. A separator having a shoe which is operated in a direction transversely of the straw carriers or grain pan needs to be set perfectly level to prevent the oscillatory movement of the shoe causing the grain to be shifted to the lower side of the sieve where it will collect to a considerable depth instead of being distributed in a sheet of more uniform depth as is the case when the shoe is operated in the same general direction as the shakers and grain pan. Better cleaning of the grain and greater capacity, or, in other words, a greater percentage of the area of the sieves are both effected. It has also been positively demonstrated that the shoe of a grain separator, to produce the best results, should be operated, as nearly as can be determined, at a speed twice the speed of the grain pan. A lower speed does not produce sufficient agitation of the sieves and grain thereon to secure the best results as regards cleaning at the maximum capacity of the shoe. A shoe driven at a speed much greater than twice that of the grain pan is subject to such violent agitation as to make this part of the separator short lived and liable to breakage. The mechanism hereinabove described secures a positive and constant relative speed of the shoe to the speed of the grain pan and straw carriers, thereby resulting in a uniform speed of the shoe.

What I claim is:—

1. In a grain and straw separating machine, the combination with two separating members mounted to oscillate in the same general direction, of means connecting said members, said means being actuated by one of said members and actuating the other member to impart two strokes to the latter to one of the former.

2. In a grain and straw separating machine, the combination with two separating members mounted to oscillate in the same general direction, of means connecting said members, including a bell crank lever actuated by one of said members and actuating the other member to impart two strokes to the latter to one stroke of the former.

3. In a grain and straw separating machine, the combination with a shaker carrier, and a shoe, both mounted on swinging supports to move in the same general direction, of means connecting said carrier and shoe, whereby one stroke of said carrier effects two strokes of said shoe.

In testimony whereof I affix my signature in presence of two witnesses.

PRIMM R. HAWTHORNE.

Witnesses:
C. A. STEBBINS,
E. P. SOUTHARD.

Copies of this patent may be obtained for five cents each, by addressing the "Commissioner of Patents, Washington, D. C."